United States Patent [19]

Black et al.

[11] Patent Number: 4,495,449
[45] Date of Patent: Jan. 22, 1985

[54] ELECTRIC PROPULSION SYSTEM FOR TRACTION VEHICLES WITH AUTOMATIC RETARD SPEED REGULATION

[75] Inventors: Kenneth G. Black; Stuart W. McElhenny, both of Erie, Pa.

[73] Assignee: General Electric Company, Erie, Pa.

[21] Appl. No.: 557,553

[22] Filed: Dec. 2, 1983

[51] Int. Cl.³ .............................................. H02P 7/685
[52] U.S. Cl. ........................................ 318/60; 318/63; 318/83; 318/84
[58] Field of Search ................ 318/53, 59, 60, 63, 318/66, 68, 69, 70, 71, 79, 80, 81, 82, 84

[56] References Cited

U.S. PATENT DOCUMENTS

| | | | |
|---|---|---|---|
| 3,713,504 | 1/1973 | Shimer et al. | 290/14 X |
| 3,866,098 | 2/1975 | Weiser | 318/251 |
| 3,911,343 | 10/1975 | Oster | 318/392 |
| 3,914,674 | 10/1975 | Maynard | 318/331 |
| 3,967,175 | 6/1976 | Turley | 318/258 |
| 3,970,858 | 7/1976 | Rist et al. | 318/153 X |
| 3,995,204 | 11/1976 | Konrad et al. | 318/373 X |
| 4,011,489 | 3/1977 | Franz et al. | 318/798 |
| 4,012,677 | 3/1977 | Rist et al. | 318/149 |
| 4,012,680 | 3/1977 | Dickerson et al. | 318/338 |
| 4,103,211 | 7/1978 | Gardner et al. | 318/87 |
| 4,189,667 | 2/1980 | Boxer | 318/338 |
| 4,200,832 | 4/1980 | Johansson et al. | 318/139 X |
| 4,284,936 | 8/1981 | Bailey et al. | 318/375 X |
| 4,348,620 | 9/1982 | Simon | 318/151 X |
| 4,423,362 | 12/1983 | Konrad et al. | 318/139 |

Primary Examiner—S. J. Witkowski
Assistant Examiner—Bentsu Ro
Attorney, Agent, or Firm—Albert S. Richardson, Jr.

[57] ABSTRACT

Two separately-excited d-c electric motors are used to drive the wheels of a traction vehicle. The magnitude of motor field current varies as a function of the value of a variable control signal, which value is representative of any deviation of the field current magnitude from a given reference magnitude. When electric braking of the vehicle is desired, the reference magnitude is normally determined by the difference (if any) between the actual rotational speed of the slower motor and a predetermined desired speed, whereby motor field current is varied as necessary to regulate the retard speed of the vehicle. Means is provided for automatically initiating the retard speed regulation mode of operation as the vehicle accelerates and the actual rotational speed of the faster motor approaches the aforesaid desired speed.

12 Claims, 5 Drawing Figures

ELECTRIC PROPULSION SYSTEM FOR TRACTION VEHICLES WITH AUTOMATIC RETARD SPEED REGULATION

BACKGROUND OF THE INVENTION

The present invention relates generally to electric propulsion systems for traction vehicles, and it relates more particularly to improved means for controlling such a system during electric braking of the vehicle.

An electric propulsion system for a traction vehicle, such as a large haulage truck, typically comprises a prime mover-driven electric generating means for supplying electric power to high horsepower traction motors respectively connected in driving relationship to a pair of wheels on opposite sides of the vehicle. The prime mover is commonly a diesel engine, and the traction motors are generally adjustable speed, reversible direct current (d-c) electric motors. A vehicle operator controls the vehicle speed and direction of travel, i.e., forward or reverse, by manipulation of a speed control pedal and a forward-reverse selector lever. This speed control pedal is adapted to control the engine speed (rpm) which determines the power output of the generating means, thus varying the magnitude of the voltage applied to the traction motors.

Deceleration of a moving vehicle is accomplished by releasing the speed control pedal and either allowing the vehicle to coast or activating its mechanical or electrical braking system. In the electric braking mode of operation the motors behave as generators, and the magnitude of the voltage generated across the armature windings of each motor is proportional to the rotational speed and the field excitation current of the motor. Dynamic braking resistor grids are connected across the armatures of the respective motors to dissipate the electric power output of the motors during electric braking. The average magnitude of current in each resistor grid is a measure of the braking effort of the associated motor.

The magnitude of motor field excitation current (and hence the braking effort) of each motor during electric braking is a function of the value of a braking call signal. In prior art systems the braking call signal value is determined by the position of a retard foot pedal that the vehicle operator can manually manipulate. To initiate braking, the operator first releases the aforesaid speed control pedal and then steps on the retard foot pedal. If the vehicle is accelerating down a hill, the operator ordinarily will allow it to coast until the vehicle speed approaches a maximum safe limit, whereupon the retard foot pedal is depressed so as to initiate electric braking and increase the braking call signal. By appropriately varying the position of the latter pedal, the maximum safe speed can be approximately maintained. This in effect is an open loop form of retard speed control. A high degree of skill is required to modulate the foot pedal position so as to maintain the vehicle speed close to optimum when going down hill on a slippery surface. If and when the operator senses that the vehicle is gaining speed while the retard pedal is fully depressed, the mechanical braking system of the vehicle must be activated.

It is common practice to protect the vehicle from overspeed by providing suitable means for automatically switching from the motoring mode of operation to an electric braking mode of operation in response to the vehicle speed exceeding a predetermined high level and for subsequently restoring the motoring mode when the vehicle slows down to a safe speed. In prior art systems the overspeed responsive means sets the braking call signal at a maximum value, whereby the full amount of braking effort is obtained. If the operator were to rely on overspeed protection to control the speed of an unloaded vehicle while traveling down a long hill, the powered wheels of the vehicle would be subjected repeatedly to high mechanical stress and their fatigue life could be undesirably shortened.

If the surface of the road bed on which the vehicle is traveling is wet or icy, there is a possibility that one or both of the powered wheels of the vehicles may start to skid or slide during electric braking. In this event it is desirable to reduce the value of the braking call signal in order to allow the sliding wheel to resume rotating at vehicle speed.

SUMMARY OF THE INVENTION

Accordingly, it is a general objective of the present invention to provide an electric propulsion system for a traction vehicle, wherein the electric braking mode of operation can be implemented with improved facility.

Another objective is to provide such a system that will automatically and correctly respond to a wheel slide condition.

In carrying out the invention in one form, a pair of adjustable speed d-c electric motors are provided for either propelling or dynamically retarding a wheeled traction vehicle. Each motor has armature windings adapted to be connected to a source of d-c voltage of variable average magnitude and field windings adapted to be connected to a separately controllable source of excitation current the average magnitude of which is variable and depends on the value of a control signal. A representative field current signal is derived from the excitation current in the field windings of the motors. Motor speed sensing and logic means is suitably arranged to provide a first feedback signal representative of the actual rotational speed of the slower motor and a second feedback signal representative of the actual rotational speed of the faster motor. The first feedback signal and the aforesaid field current signal, along with a command signal that is produced when dynamic retarding of the vehicle is desired, are supplied to control means which is effective when said command signal is produced for making the value of the aforesaid control signal representative of any deviation of the absolute magnitude of excitation current from a reference magnitude which is normally determined by the error between the slower motor speed and a preselected optimum speed. In this closed loop form of retard speed regulation, the magnitude of the motor field excitation current is varied as necessary to minimize the aforesaid speed error. By comparing the slower motor speed with the aforesaid preselected speed to determine the speed error (if any), the excitation current will be appropriately reduced if either one of the powered wheels of the vehicle starts to slide. The second speed feedback signal is supplied to suitable means for producing the aforesaid command signal in response to the faster motor speed exceeding a predetermined speed which is slightly lower than the aforesaid preselected optimum speed, whereby the retard speed regulation mode of electric braking is automatically initiated as the vehicle accelerates and the speed of the faster motor approaches the optimum speed.

The invention will be better understood and its various objects and advantages will be more fully appreciated from the following description taken in conjunction with the accompanying drawings.

DESCRIPTION OF THE PREFERRED EMBODIMENT

Figure 1:
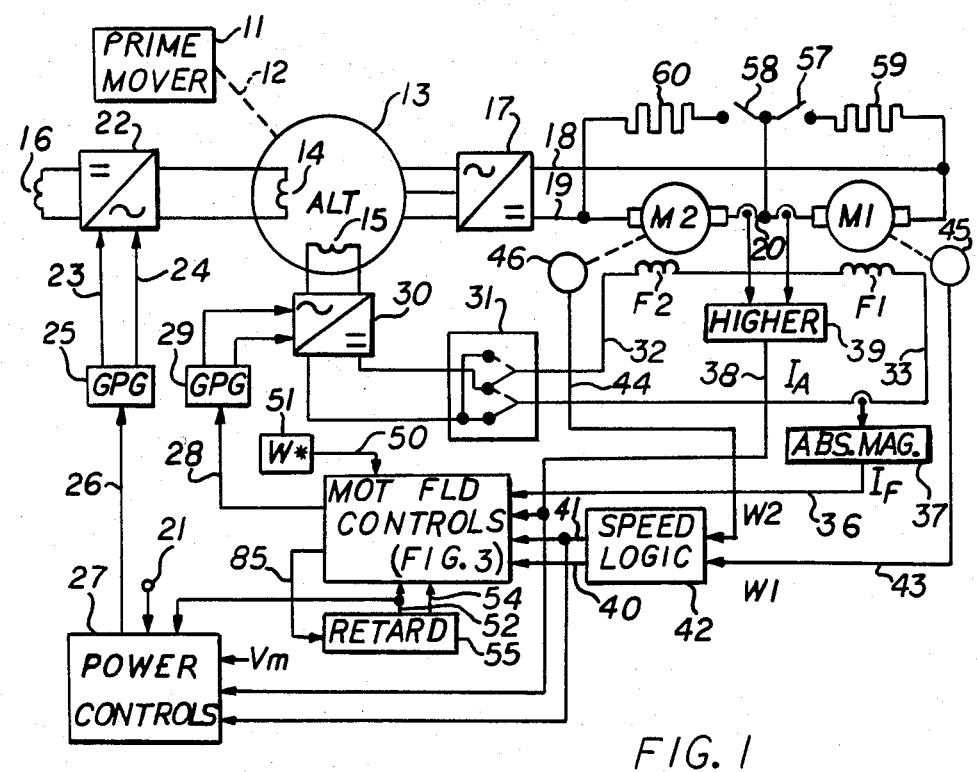
FIG. 1 is a functional block diagram of a dual-motor electric propulsion on system embodying the present invention.

The electric propulsion system that is shown in FIG. 1 is intended to be physically located on a self-propelled traction vehicle such as a large off-highway haulage truck. An operator-controlled throttle (e.g., a foot pedal, not shown) is adapted to control the rotational speed (revolutions per minute) of a prime mover 11 which may, for example, be a diesel engine. The output shaft 12 of the engine is drivingly coupled to the rotor of an alternating current (a-c) generator 13 (herein referred to as an alternator) which has a set of 3-phase main windings (not shown), a pair of auxiliary (tertiary) windings 14 and 15, and field windings 16. The 3-phase generally sinusoidal alternating voltage that is generated in the main windings of the alternator 13 is converted to direct voltage by means of an uncontrolled full-wave rectifying bridge 17 whose output in turn is coupled, via lines 18, 19 and 20, to serially connected armatures of a pair of adjustable speed d-c traction motors M1 and M2. The motors M1 and M2 have separately excited field windings F1 and F2, respectively. The rotors of these motors are respectively coupled through suitable speed-reduction gearing to a pair of wheels (not shown) located on opposite sides of the vehicle. By suitably controlling the speed of the engine 11 and the excitation of the alternator and motor fields, the vehicle can be propelled (also known as "motoring") or dynamically retarded (also known as "electric braking") by its motors in either a forward or a reverse direction.

During the motoring mode of operation, the motors M1 and M2 will each rotate at a speed that depends on both the magnitude of excitation current in their fields F1, F2 and the magnitude of the voltage applied to their respective armature windings. The latter magnitude is a function of both the speed at which the alternator 13 is driven and the magnitude of excitation current in the alternator field 16. The alternator field excitation current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated power control means 27.

The power control means 27 receives a first input signal representative of the voltage $V_M$ at the output of the rectifying bridge 17, a second input signal representative of the current $I_A$ in the armature windings of the motors M1 and M2, a third input signal (from a terminal 21) that varies with the rotational speed of the engine 11, and the other inputs shown in FIG. 1. In the motoring mode this control means is effective to produce on line 26 an output signal having a value normally representative of any magnitude error between a power feedback signal which is proportional to the product of $V_M$ and $I_A$ and a load reference signal which varies as a function of engine speed. In the event of relatively high magnitudes of $V_M$, $I_A$, or motor speed, an overriding feedback signal proportional to the appropriate one of these parameters is substituted for the power feedback signal, and during the electric braking mode of operation a preselected constant reference signal is substituted for the aforesaid load reference signal. The output signal on line 26 controls the operation of the gate pulse generator 25 and thereby determines the magnitude of current in the field 16. As a result, the alternator field excitation is regulated in a desired manner.

As illustrated in FIG. 1, a motor field control means (labeled "MOT FLD CONTROLS") produces an independently variable control signal on an output line 28 which is connected to a conventional gate pulse generator 29. This generator supplies periodic firing signals to another single-phase, full-wave phase controlled rectifying bridge 30 connected between the second auxiliary winding 15 of the alternator 13 and the fields F1 and F2 of the motors M1 and M2. The two motor fields are connected in series with each other to the direct voltage output of the rectifier 30 via lines 32 and 33 and a polarity reversing switch 31. Thus the auxiliary winding 15, the rectifier 30, and the associated gate pulse generator 29 comprise a separately controllable source of excitation current for the motor fields F1 and F2. This current has a variable average magnitude, and its direction in the motor fields depends on the position of the reversing switch 31. With the switch in its solid-line position, current flows from left to right through the field windings F2 and F1 as viewed in FIG. 1, and the motors rotate in a clockwise direction. On the other hand, with the switch 31 in its broken-line position, current flows from right to left through the field windings and the motors rotate in the opposite or counter-clockwise direction.

The average magnitude of excitation current in the series-connected field windings F1 and F2 will depend on the value of the control signal that is supplied to the gate pulse generator 29 over the output line 28 of the motor field control means. The motor field control means receives input signals on seven different lines 36, 38, 40, 41, 50, 52, and 54, respectively. The input on line 36 is a field current signal having a value that varies with the average absolute magnitude ($I_F$) of excitation current in the motor field windings F1 and F2. To derive this signal, the line 36 is coupled to a conventional current transducer in line 33 via suitable means 37 for converting the bipolarity output of the current transducer to a unipolarity voltage signal, on line 36, representative of $I_F$. More particularly, the electric potential on line 36, measured with respect to a predetermined reference potential (e.g., ground), has a magnitude proportional to the number of amperes flowing in line 33, and it has a relatively negative polarity regardless of whether the polarity of the transducer output signal is positive or negative with respect to ground.

The signal on the second input line 38 has a value that varies with the average magnitude of motor armature current $I_A$. To derive this signal, the line 38 is coupled via a higher magnitude selector 39 to a pair of current transducers which are respectively located in the connections from the line 20 to the armatures of the motors M1 and M2. As a result, the signal on line 38 is actually representative of the higher current magnitude in the armature windings of the two motors.

In accordance with the present invention, the signals on the third and fourth input lines 40 and 41 are speed feedback signals representative, respectively, of the actual rotational speeds of the slower motor and of the faster motor. These signals are provided by a speed logic means 42 which in turn is coupled via lines 43 and 44 to a pair of conventional speed sensors 45 and 46 that are respectively associated with the rotors of the two motors M1 and M2. The output of the speed sensor 45 is a signal W1 whose value varies with the angular velocity of the rotor of motor M1, and the output of the speed sensor 46 is a signal W2 whose value varies with the angular velocity of the rotor of motor M2. Preferably each of the signals W1 and W2 is actually a train of discrete pulses of constant amplitude and duration but having a variable frequency directly proportional to the speed of the associated motor. In the preferred embodiment of the speed logic means 42 (see FIG. 2), the signals W1 and W2 are respectively supplied to a pair of digital-to-analog signal converters 47 of known design, and the individual analog signal at the output of each converter is fed to the inputs of two selector circuits 48 and 49. In the circuit 48 the higher input signal is blocked and the analog signal of lesser magnitude is fed to the line 40, whereas the circuit 49 is arranged to pass the analog signal of greater magnitude to the line 41.

Returning to FIG. 1, the fifth input line 50 originates at a block 51 which represents manually controlled means for providing a speed reference signal W* of preselected value, and the sixth and seventh input lines 52 and 54 originate at a retard command block 55. The latter block represents manually controlled means for producing on line 52 a predetermined command signal when dynamic retarding of the vehicle is desired and for providing on line 54 a braking signal having a value that depends on the degree of dynamic retarding that the operator of the vehicle desires. In response to the command signal being produced on line 52, conventional means (not shown) causes a pair of contactors 57 and 58 to close in unison, thereby connecting a first braking resistor grid 59 between lines 18 and 20 and concurrently connecting a second braking resistor grid 60 between lines 19 and 20. These resistor grids are used to dissipate the electric power output of the respective motors M1 and M2 which behave as generators during the electric braking mode of operation. The amount of braking torque exerted by the motors is a function of both the magnitude of $I_A$ and the magnitude of $I_F$. In this mode, $I_A$ varies with the voltage generated across the armature windings of the motor, and the magnitude of the generated voltage in turn is proportional to motor speed and field excitation. As previously explained, the magnitude of excitation current in the motor field windings depends on the value of the control signal on the output line 28 of the motor field control means.

Figure 3:
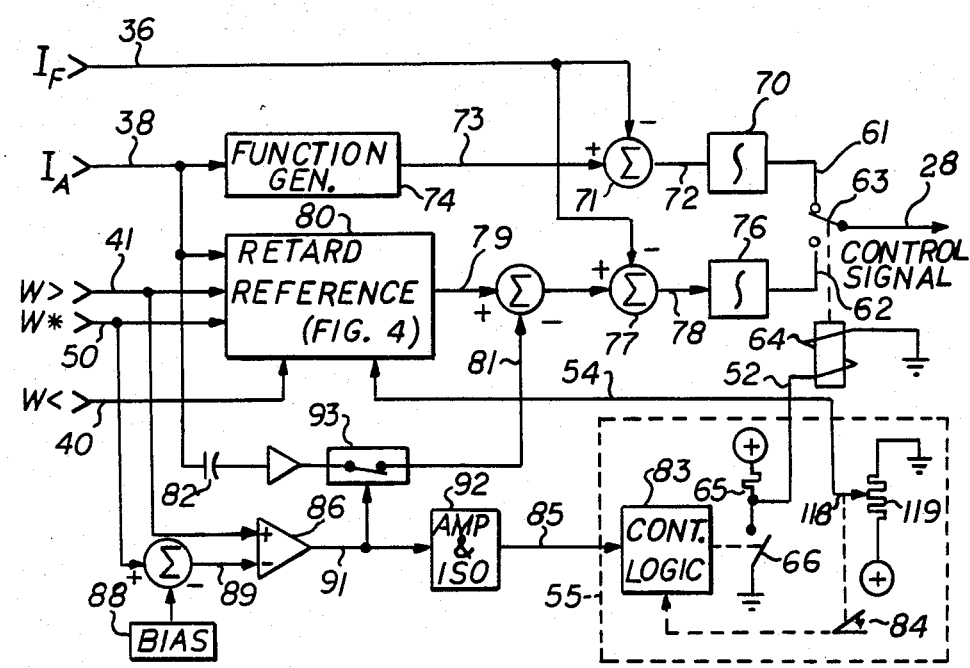
FIG. 3 is a schematic circuit diagram of the motor field control means shown in block form in FIG. 1.

The presently preferred embodiment of the motor field control means is shown in FIG. 3. It includes switching means for connecting the output line 28 to either a first line 61 or a second line 62. Preferably this switching means comprises an electromechanical type of switch having a current conducting contact 63 that is moved between "picked up" and "dropped out" positions by an actuating coil 64. The contact actuating coil 64 is shown connected between the input line 52 and ground. In the previously mentioned retard command block 55, the line 52 is connected through a resistor 65 to a relatively positive control power terminal, and it is also connected through a normally open switch 66 to ground. So long as the switch 66 is open (which is true in the motoring mode), there is current in line 52 to energize the actuating coil 64 which consequently holds the contact 63 in its upper or picked up position, thereby connecting the output line 28 to the first line 61 as is shown in FIG. 3. However, whenever the switch 66 is closed (which is true in the electric braking mode), the line 52 is at ground potential, the coil 64 is deenergized, and the contact 63 is in its lower or dropped out position in which it is effective to connect the output line 28 to the second line 62. Note that there is no current in line 52 when the aforesaid predetermined retard command signal is produced, whereas there is current in line 52 in the absence of such a signal. In other words, the command means 55 supplies a bistable digital logic signal on line 52; this signal is high or "1" when the motoring mode is desired, but it is low or "0" when the retard command signal is produced.

Figure 2:
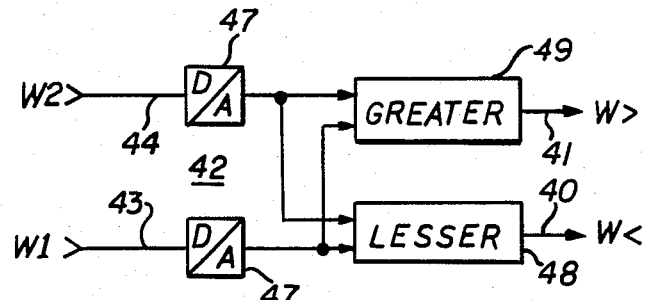
FIG. 2 is a functional block diagram of the "speed logic" means shown as a single block in FIG. 1.

In the motor field control means, the first line 61 is connected to the output of an integrator 70. The integrator 70 receives an input signal from a summing means 71 to which it is connected by a line 72. In the summing means 71 the field current signal on line 36 is subtracted from a current reference signal on a line 73, whereby the output of the summing means is a current error signal having a value that varies with the magnitude difference, if any, between the signals on lines 36 and 73. Consequently, in the motoring mode of operation the value of the control signal on output line 28 varies as a function of the time integral of the current error signal on line 72. The current reference signal on the line 73 is taken from the output of a function generator 74 to which the armature current signal on the second input line 38 is supplied. The function generator 74 is suitably constructed and arranged so that the magnitude of the reference signal 73 tracks the magnitude of the input signal on line 38 according to a predetermined desired relationship between $I_F$ and $I_A$. An example of such a relationship is shown in FIG. 2 of U.S. Pat. No. 4,103,211—Gardner et al. It will now be apparent that during motoring the control signal on line 28 has a value representative of any deviation of $I_F$ from a first reference magnitude which varies as a predetermined function of $I_A$, and the source of motor field excitation current responds to variations in the control signal value by increasing or decreasing $I_F$ as necessary to minimize such deviation.

Figure 4:
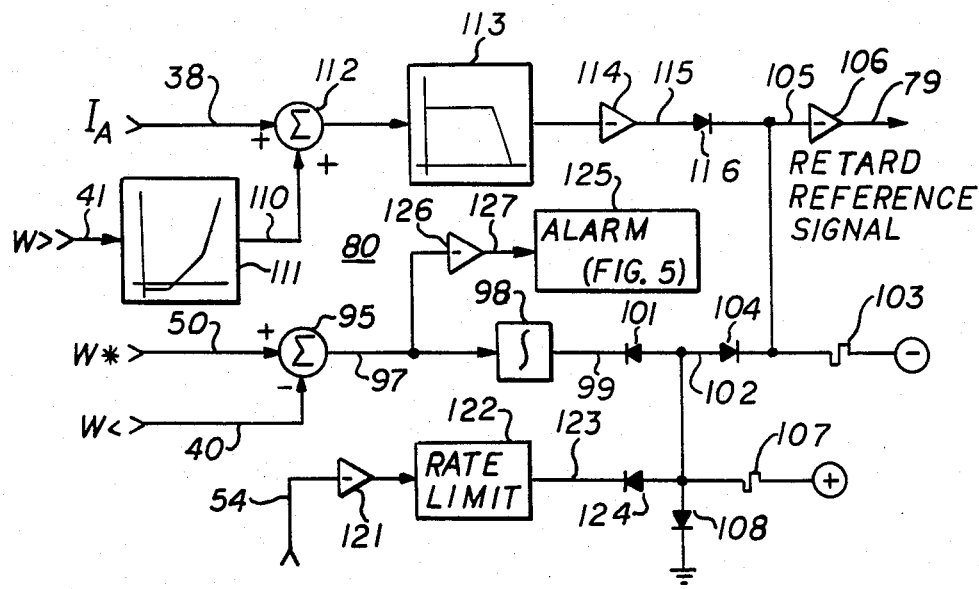
FIG. 4 is a schematic diagram of a preferred embodiment of the "retard reference" block of FIG. 3.

As is shown in FIG. 3, the second line 62 is connected to the output of another integrator 76. The integrator 76 receives an input signal from a summing means 77 to which it is connected by a line 78. The summing means 77 has two inputs which in turn are supplied with the field current signal on line 36 and with a retard reference signal on a line 79, and the signal at its output therefore comprises the algebraic sum of these input signals. The retard reference signal is produced by signal generating means 80, and a stabilizing signal on a line 81 is optionally subtracted from it. Details of the retard reference signal generating means 80 are shown in FIG. 4 which will soon be described. The line 81 is connected via an amplifier and a capacitor 82 to the input line 38, whereby the stabilizing signal on line 81 will vary with the rate of change of the armature current signal on line 38.

From the description in the preceding paragraph, it is apparent that the value of the signal on the line 62 of the motor field control means normally varies as a function of the time integral of the difference, if any, between the value of the field current signal on line 36 and the value of the retard reference signal on line 79. In the electric braking mode of operation, the contact 63 is in its dropped out position, and the control signal on line 28 is consequently the same as the signal on line 62. This is true when the switch 66 in the retard command block 55 is closed (i.e., when the aforesaid command signal is produced). The retard command block 55 includes suitable contact logic means 83 for closing the switch 66 whenever the operator of the vehicle depresses a conventional retard foot pedal 84. In accordance with the present invention, the contact logic means 83 is also arranged to close the switch 66 in automatic response to an activating signal being applied to an input line 85 of the retard command block 55, and this activating signal is produced if and when the actual rotational speed of the faster motor exceeds a predetermined desired speed.

FIG. 3 shows the preferred embodiment of the means for producing the activating signal on line 85. It comprises a comparator 86 for determining whether the value of the faster-motor speed feedback signal on the input line 41 is greater or less than a predetermined level which is slightly less than the value of the speed reference signal W* on the input line 50. More particularly, the speed feedback signal on line 41 is fed to the positive input line of the comparator 86, whereas the speed reference signal on line 50 is fed, via a summing point that in effect reduces this signal by a relatively small constant magnitude determined by a bias circuit 88, to the negative input line 89 of the same comparator. The output of the comparator 86 is coupled to the input line 85 of the retard command block 55 by way of a line 91 and a block 92 representing conventional amplifying and isolating means.

During the motoring mode, the speed reference signal W* has a high positive magnitude corresponding to a speed that is higher than the maximum motor speed, and the output of the comparator 86 remains low or "0." In this state there is no activating signal on the line 85. But when the vehicle is moving slowly at or near the brink of a downhill section of the road on which it is traveling, W* is manually changed to a preselected lower magnitude that corresponds to the motor speed at which retard speed regulation is desired. Subsequently, as the vehicle accelerates, the increasing magnitude of the speed feedback signal on line 41 equals and then exceeds the magnitude of the biased reference signal on line 89, whereupon the comparator 86 produces a high or "1" output signal on the line 91. Now an activating signal is applied to the line 85, and the switch 66 is closed by the contact logic means 83. In this manner the electric braking mode of operation is automatically initiated. At the same time, the output signal on line 91 causes an electronic switch 93 to open its contact, thereby disconnecting the line 81 from the capacitor 82 and ensuring that no stabilizing signal is subtracted from the retard reference signal on line 79.

Figure 5:
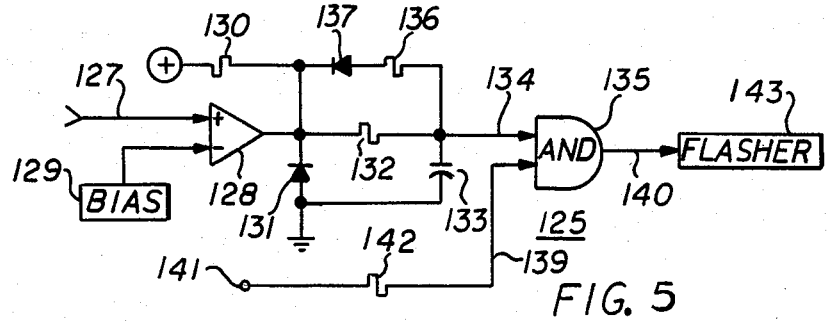
FIG. 5 is a simplified schematic circuit diagram of the "alarm" block of FIG. 4.

The retard reference signal generating means 80 will now be described with reference to FIGS. 4 and 5. It includes summing means 95 for subtracting the slower-motor speed feedback signal on input line 40 from the speed reference signal W* on input line 50. Consequently the summing means 95 derives on its output line 97 a speed error signal having a value that varies with the difference, if any, between the values of the signals on lines 40 and 50, respectively. In the illustrated embodiment of the invention these signals are analogs of the parameters they respectively represent. Therefore the speed error signal on line 97 has a magnitude proportional to the magnitude difference between the signals on lines 40 and 50 and a polarity that is either positive or negative with respect to ground, depending on whether the actual rotational speed of the slower motor is lower or higher than a predetermined desired speed. The last-mentioned desired speed is established by the preselected magnitude of W*. It is higher than the previously-mentioned predetermined desired speed at which the comparator 86 first produces a high output signal that in turn causes the retard command block 55 automatically to close the switch 66 and thereby initiate an electric braking mode of operation.

The summing means 95 is connected to the output line 79 of the retard reference signal generating means 80 by circuit means including, in the named sequence, an integrator 98, a line 99, a diode 101, a line 102, another diode 104, a line 105, and a polarity-inverting amplifier 106. The line 105 is connected through a resistor 103 to a relatively negative control power terminal. The line 102 is connected through a resistor 107 to the relatively positive control power terminal and through a diode 108 to ground, and therefore its potential can never be appreciably positive with respect to ground. The diode 101 is polled to block current whenever the integrator output signal on line 99 is positive with respect to ground. Consequently the speed error signal on line 97 will not influence the value of the retard reference signal on line 79 so long as the signal on line 99 is positive, which is true when the magnitude of the slower-motor speed feedback signal on line 40 is substantially less than the magnitude of W*.

If the vehicle accelerates enough so that the rotational speed of the slower motor exceeds the predetermined desired speed established by W*, the integrator 98 responds to the negative error signal on line 97 by varying its output signal in a negative-going sense. In response to a negative output signal on line 99, the interconnecting circuit means is operative normally to produce at line 79 a retard reference signal of inverted polarity and directly proportional magnitude (unless the signal on line 99 is overridden by other signals of greater or lesser value, as will soon be explained). Under these conditions it is apparent that the value of the retard reference signal varies as a function of the time integral of the speed error signal on line 97. The retard reference signal on line 79 is summed with the field current signal on input line 36 in the previously described motor field control means (FIG. 3) where the contact 62 is now in its dropped out position (because the switch 66 closed when the faster motor attained a predetermined rotational speed slightly lower than the speed of the slower motor at which the polarity of the speed error signal on line 97 changes from positive to negative). As a result, during this automatic retard speed regulation mode of electric braking, the control signal on line 28 will have a value representative of any deviation of $I_F$ from a second reference magnitude which is normally determined by the error between the actual speed of the slower motor and the aforesaid desired speed established by the speed reference signal W*, and the source of motor field excitation current will respond to variations in the control signal value by varying $I_F$ as necessary to minimize this error.

As is shown in FIG. 4, the circuit means that interconnects the summing means 95 and the output line 79 of the retard reference signal generating means 80 is supplied with several signals in addition to the speed error signal on line 97. If and when these additional signals have sufficiently great values, they are effective to override the signal on the integrator output line 99, thereby either increasing or limiting the value of the retard reference signal on line 79 compared to the value that is normally produced.

One of the aforesaid additional signals is the armature current signal on input line 38. Another one is a speed taper signal on the output line 110 of a known function generator 111 to which the faster-motor speed feedback signal on line 41 is supplied. Whenever the speed of the faster motor exceeds a predetermined threshold, the magnitude of the speed taper signal on line 110 varies in accordance with the input-vs-output relationship shown inside the block designated by the reference numeral 111 in FIG. 4. The lines 38 and 110 are connected to two inputs of a summing means 112, and the output of this summing means is coupled via another function generator 113, a polarity-inverting amplifier 114, a line 115, and a diode 116 to the line 105. The function generator 113 is so constructed and arranged that its output signal normally has a high, constant magnitude but decreases sharply as the input signal (which equals the sum of the armature current signal on line 38 and the speed taper signal on line 110) increases above a predetermined high threshold level. This output is inverted to a negative limit signal on line 115, whereby the diode 116 is normally reverse biased. But whenever the input to the function generator 113 exceeds the above-mentioned threshold level and the magnitude of the negative limit signal on line 115 is less than the magnitude of the signal on line 102, the diode 116 conducts while the diode 104 blocks current, and consequently the value of the retard reference signal on line 79 will then be determined by the limit signal magnitude. In this event, the value of the control signal on line 28 decreases, and less excitation current is supplied to the motor fields. This will limit current at relatively low motor speeds so as to protect the motors from overheating, and it will reduce $I_A$ at high speeds so as to decrease the risk of flashovers at the commutators of the motors.

The third one of the aforesaid additional signals is the braking signal on the input line 54. As is indicated in FIG. 3, line 54 originates in the retard command block 55 at the slider 118 of a potentiometer 119 which is connected between the relatively positive control power terminal and ground. The setting of the slider, and hence the magnitude of the braking signal on line 54, is determined by the position of the manually controlled retard foot pedal 84. As is shown in FIG. 4, the input line 54 is connected to the line 102 via a polarity-inverting amplifier 121, a conventional rate limit circuit 122, a line 123, and a diode 124. With this arrangement, the operator can override the normal operation of the summing means 95 and integrator 98 by depressing the foot pedal 84 so that the braking signal on line 54 will have a high magnitude compared to the magnitude of the speed error signal on line 97. Under this condition, the magnitude of the inverted, rate-limited braking signal on line 123 becomes greater than the magnitude of the integrator output signal on line 99, the diode 124 conducts while the diode 101 blocks current, and the magnitude of the signal on the line 102 is alternatively determined by the braking signal value. As a result, the value of the control signal on line 28 increases, and more excitation current is supplied to the motor fields. This will increase the degree of dynamic retarding so that the motors slow down and the vehicle decelerates.

As another feature of the invention, an alarm circuit 125 is associated with the retard reference signal generating means 80. The speed error signal on line 97 is supplied to the alarm circuit 125 by means of a unity-gain, polarity-inverting amplifier 126 and a line 127. A preferred embodiment of the alarm circuit is shown in FIG. 5. It comprises a comparator 128 having a positive input to which the line 127 is connected and a negative input to which a bias signal source 129 is connected. The source 129 supplies the comparator with a bias signal of predetermined constant magnitude. The output of the comparator 128 is connected through a resistor 130 to the positive control power terminal, and it is connected to ground through a diode 131 which is shunted by a time delay circuit comprising a resistor 132 in series with a capacitor 133. The juncture of resistor 132 and capacitor 133 is connected to a first input line 134 of suitable means 135 for performing an "AND" logic function. The resistor 132 is shunted by a fast reset circuit comprising another resistor 136 in series with a diode 137 which is polled to conduct capacitor discharge current. The AND logic means 135 has a second input line 139 and an output line 140. A terminal line 141 is connected to the line 139 via a resistor 142, and a high or "1" signal is normally applied to this terminal.

So long as the magnitude of the slower-motor speed feedback signal on line 40 is less than the magnitude of the speed reference signal on line 50, there is a positive speed error signal on line 97 (FIG. 4) and the polarity of the signal on the line 127 will consequently be negative with respect to ground. Under this condition the output of the comparator 128 (FIG. 5) is low or "0," and there can be no positive signal of appreciable magnitude on the first input line 134 of the AND logic means 135. But if and when the speed of the slower motor increases sufficiently so that the speed error signal becomes negative and so that the magnitude of the inverted signal on line 127 becomes greater than the predetermined magnitude of the bias signal from the source 129, the comparator produces a high positive output signal which charges the capacitor 133. The magnitude of the signal on line 134 increases with positive polarity as the capacitor 133 charges. After a predetermined interval of time (e.g., 5 seconds) it reaches (and subsequently exceeds) a minimum level to which the logic means 135 can respond. Once this level is attained, the logic means will produce a high or "1" signal on its output line 140 if its second input line 139 is then concurrently receiving a relatively high positive signal. The normally high signal at terminal 141, and consequently on line 139, will permit the logic means 135 to produce a high signal on its output line 140 in response to the high signal on the input line 134, whereas a low signal at terminal 141 prevents this response and therefore disables the alarm circuit 125.

A high signal on output line 140 is used to activate a flashing light 143 or other suitable alarm signal. As will now be apparent, the alarm 125 is activated if the actual speed of the vehicle exceeds the desired speed by more than a predetermined amount (e.g., three miles per hour) for longer than the aforesaid predetermined interval of time during the automatic retard speed regulation mode. This indicates to the operator that electric braking is not holding the called-for speed and that mechanical braking should be utilized to decrease the vehicle speed. As soon as the vehicle slows down enough to reduce the inverted speed error signal on line 127 to a magnitude that equals (or is less than) the bias magnitude of source 129, the comparator 128 reverts to its low output state, the capacitor 133 rapidly discharges through the parallel resistors 132 and 136, and the AND logic means quickly stops producing the alarm activating signal on its output line 140.

While a preferred embodiment of the invention has been shown and described by way of example, many modifications will undoubtedly occur to persons skilled in the art. For example, known digital or microprocessor techniques could be used in lieu of the illustrated analog signals and discrete circuits. The concluding claims are therefore intended to cover all such modifications as fall within the true spirit and scope of the invention.

We claim:

1. In a traction vehicle propulsion system comprising a pair of adjustable speed d-c electric motors which can either propel or dynamically retard the vehicle, each of said motors having armature windings adapted to be connected to a source of d-c voltage of variable average magnitude and having field windings adapted to be connect to a separately controllable source of excitation current the average magnitude of which is variable and depends on the value of a control signal that is supplied to said controllable source, said propulsion system including command means for producing a predetermined command signal when dynamic retarding of the vehicle is desired, the improvement comprising:
   a. first means coupled to both of said motors for providing a feedback signal representative of the actual rotational speed of the slower motor;
   b. second means for providing a speed reference signal of preselectable value; and
   c. control means connected to said first and second means and to said command means and responsive to the excitation current in said field windings for producing said control signal, said control means including
      (i) third means effective in the absence of said command signal for making the value of said control signal representative of any deviation of the absolute magnitude of said excitation current from a first reference magnitude which varies as a predetermined function of the magnitude of current in the amature windings of said motors, and
      (ii) fourth means effective when said command signal is produced and responsive to the rotational speed of the slower motor exceeding a first predetermined desired speed for making said control signal value representative of any deviation of the absolute magnitude of said excitation current from a second reference magnitude which is normally determined by the error between said slower motor speed and said first predetermined desired speed, whereby said excitation current magnitude is varied as necessary to minimize said error.

2. The improvement of claim 1 for a propulsion system that further includes manually controlled means for providing a braking signal having a value that depends on the degree of dynamic retarding desired by the operator of the vehicle, in which said braking signal is supplied to said fourth means which is so arranged that said second reference magnitude is alternatively determined by the value of said braking signal when said desired degree of retarding is relatively high.

3. The improvement of claim 2, and further comprising means associated with said fourth means and effective when said slower motor speed exceeds said first predetermined desired speed for providing a predetermined alarm signal in response to said speed error being greater than a predetermined amount for longer than a predetermined interval of time.

4. The improvement of claim 1, in which said first means is arranged to provide a second feedback signal representative of the actual rotational speed of the faster motor, and further comprising:
   a. means connected to said first and second means for producing a predetermined output signal whenever the actual rotational speed of the faster motor exceeds a second predetermined desired speed, and
   b. means connected to said output signal producing means and associated with said command means for causing said command means to produce said command signal in automatic response to said output signal.

5. The improvement of claim 4, in which said first predetermined desired speed is higher than said second predetermined desired speed.

6. The improvement of claim 4 for a propulsion system that further includes manually controlled means for providing a braking signal having a value that depends on the degree of dynamic retarding desired by the operator of the vehicle, in which said braking signal is supplied to said fourth means which is so arranged that said second reference magnitude is alternatively determined by the value of said braking signal when said desired degree of retarding is relatively high.

7. The improvement of claim 1 for a propulsion system that further includes means for deriving a field current signal having a value that varies with the absolute magnitude of said excitation current, in which said fourth means includes
   a. retard reference signal generating means comprising (i) an output line, (ii) first summing means connected to said first and second means for deriving a speed error signal having a value that varies with the difference, if any, between the values of said feedback and speed reference signals, and (iii) circuit means connected between said output line and said first summing means and operative in response to the speed error signal derived when said slower motor speed exceeds said first predetermined desired speed to produce at said output line a retard reference signal the value of which is normally determined by the value of said speed error signal, and
   b. second summing means responsive to said retard reference signal and to said field current signal and effective when said command signal is produced for deriving said control signal which consequently is representative of the value difference between said field current signal and said retard reference signal.

8. The improvement of claim 7 in which said circuit means includes an integrator, whereby the value of said retard reference signal normally varies as a function of the time integral of said speed error signal.

9. The improvement of claim 7 for a propulsion system that further includes manually controlled means for providing a braking signal having a value that depends on the degree of dynamic retarding desired by the operator of the vehicle, in which said circuit means is supplied with said braking signal and is operative when said braking signal value is high compared to the value of said speed error signal so that the value of said retard reference signal is alternatively determined by said braking signal value.

10. The improvement of claim 9, and further comprising means associated with said fourth means and effective when said feedback signal has a higher value than said speed reference signal for providing a predetermined alarm signal in response to the value of said speed error signal exceeding a predetermined value for longer than a predetermined interval of time.

11. The improvement of claim 7, in which said first means is arranged to provide a second feedback signal representative of the actual rotational speed of the faster motor, and further comprising:
  a. means connected to said first and second means for producing a predetermined output signal whenever the actual rotational speed of the faster motor exceeds a second predetermined desired speed, and
  b. means connected to said output signal producing means and associated with said command means for causing said command means to produce said command signal in automatic response to said output signal.

12. The improvement of claim 11 for a propulsion system that further includes means for deriving an armature current signal having a value that varies with the magnitude of current in the armature windings of said motors, in which said circuit means includes
  (i) means responsive to said second feedback signal for providing a speed taper signal having a value that varies as a predetermined function of the speed of the faster motor and
  (ii) means for deriving a limit signal having a large value so long as the sum of the respective values of said armature current signal and said speed taper signal is not above a predetermined high threshold level and having a value that decreases as said sum increases above said threshold level, said circuit means being operative when said limit signal value is relatively small so that said retard reference signal is limited to a value determined by said limit signal value.

* * * * *